(12) United States Patent
Aluigi

(10) Patent No.: US 7,921,866 B2
(45) Date of Patent: Apr. 12, 2011

(54) FIRST STAGE PRESSURE REGULATOR FOR A TWO-STAGE UNDERWATER BREATHING APPARATUS

(75) Inventor: Rolando Aluigi, Sori (IT)

(73) Assignee: Scubapro Europe S.R.L., Casarza Ligure (IT)

( * ) Notice: Subject to any disclaimer, the term of this patent is extended or adjusted under 35 U.S.C. 154(b) by 724 days.

(21) Appl. No.: 11/908,606

(22) PCT Filed: Mar. 1, 2006

(86) PCT No.: PCT/EP2006/060364
§ 371 (c)(1),
(2), (4) Date: Sep. 14, 2007

(87) PCT Pub. No.: WO2006/097403
PCT Pub. Date: Sep. 21, 2006

(65) Prior Publication Data
US 2008/0135102 A1    Jun. 12, 2008

(30) Foreign Application Priority Data
Mar. 15, 2005    (IT) .................................. SV05A0009

(51) Int. Cl.
*A62B 18/10*    (2006.01)
(52) U.S. Cl. ............. 137/81.2; 137/505.11; 137/505.44; 128/201.28; 128/204.29; 128/205.24
(58) Field of Classification Search .................. 137/81.2, 137/78.1, 505, 505.42, 505.11, 505.47, 505.44; 128/201.28, 204.29, 205.24
See application file for complete search history.

(56) References Cited

U.S. PATENT DOCUMENTS

| | | | |
|---|---|---|---|
| 2,855,923 A | | 10/1958 | Kimes et al. |
| 3,495,607 A | * | 2/1970 | Shugarman ................. 137/81.2 |
| 4,167,184 A | * | 9/1979 | Kohnke .................... 128/205.13 |
| 5,097,860 A | | 3/1992 | Ferguson et al. |
| 5,176,169 A | | 1/1993 | Ferguson |
| 5,184,609 A | * | 2/1993 | Hart ........................ 128/205.24 |
| 5,413,096 A | * | 5/1995 | Hart ........................ 128/205.24 |
| 5,497,803 A | * | 3/1996 | Ferrante .................. 137/505.42 |
| 5,778,875 A | * | 7/1998 | Morgan et al. ......... 128/204.26 |
| 5,810,041 A | * | 9/1998 | Garofalo .................... 137/81.2 |
| 5,911,220 A | * | 6/1999 | Morgan et al. ......... 128/205.24 |
| 7,261,107 B2 | * | 8/2007 | Peyron .................... 128/205.24 |

FOREIGN PATENT DOCUMENTS

| | | |
|---|---|---|
| CH | 585363 | 2/1977 |
| EP | 0336307 | 10/1989 |
| GB | 1531768 A | 11/1978 |

* cited by examiner

*Primary Examiner* — Craig M Schneider
(74) *Attorney, Agent, or Firm* — Reinhart Boerner Van Deuren P.C.

(57) ABSTRACT

A first stage pressure regulator for a two-stage underwater breathing apparatus, comprises a second movable wall (16, 18) for separating a balance chamber (10) from an ambient exposed chamber (17). The second movable wall is formed by a disk-shaped piston (16) which is slideably and non sealingly guided along the peripheral walls that delimit the balance chamber (10), and by an elastically deformable diaphragm (18), which overlies the side of the piston (16) facing forward the ambient exposed chamber (17). The elastically deformable diaphragm (18) forms with said piston (16) a diaphragm type pressure relief valve (20, 318).

17 Claims, 3 Drawing Sheets

FIRST STAGE PRESSURE REGULATOR FOR A TWO-STAGE UNDERWATER BREATHING APPARATUS

FIELD OF INVENTION

The invention relates to a first stage pressure regulator for a two-stage underwater breathing apparatus, which first stage regulator is connected to a source of high pressure breathable gas, and comprises:

an inlet connected to the source of high-pressure gas and an outlet for gas having a lower pressure than the incoming gas;

a high pressure gas chamber communicating with said inlet and a low pressure gas chamber connected with said outlet;

the low pressure gas chamber communicating with the high pressure gas chamber through a regulating valve;

a balance chamber interposed between the low pressure gas chamber and a chamber communicating with the ambient or directly the ambient;

said low pressure gas chamber being sealingly separated from the balance chamber by a first movable wall;

said balance chamber being sealingly separated from the ambient exposed chamber by a second movable wall;

said first and said second movable walls being mechanically and rigidly interconnected by stem which is designed to transfer the force exerted on said movable walls;

said first movable wall being further connected by force transfer means to the closing element of the valve interposed between the high pressure gas chamber and the low pressure gas chamber;

a check valve being provided, for relieving the overpressure in the compensation chamber, between said compensation chamber and said ambient exposed chamber.

BACKGROUND OF THE INVENTION

First stage pressure regulators of the above type are known in the art. The overpressure that may build up in the balance chamber is relieved thanks to the tubular shape of the force transfer stem between the first and the second movable walls which sealingly separate the balance chamber from the low pressure gas chamber and the ambient exposed chamber respectively. A hole in the tubular wall puts in communication the inside of the tubular stem with the balance chamber, whereas a pressure relief valve is provided at the end for connection to the second movable wall which separates the balance chamber from the ambient exposed chamber, which valve is a one-way valve or a check valve whose shut-off direction corresponds to a flow direction from the ambient exposed chamber to the balance chamber.

A valve of this type is known, for example, from U.S. Pat. No. 5,097,860.

The provision of a balance chamber having means for transferring force to the regulating valve element between the high pressure gas chamber and the low pressure gas chamber, which force transfer means are two movable walls rigidly interconnected by the intermediate stem and a force transfer extension connected to the regulating valve element allows to adapt the pressure regulating valve calibration to ambient pressure conditions.

The first and the second movable walls generally consist of combinations of pistons cooperating with elastically deformable diaphragms, and elastic means are generally further provided for adjusting a certain preload on said movable walls, and operating in the same direction as the force exerted by ambient pressure.

The above construction of prior art pressure regulators has a number of drawbacks. The pressure relief valve is generally fixed to the tubular stem and requires the diaphragm to be also perforated in the area of the tubular stem. Furthermore, the pressure relief valve is very small and thence relatively expensive and makes assembly more difficult, besides being itself a construction part.

The tubular stem requires a transverse hole to be formed therein for communication of the inside tubular space with the balance chamber.

SUMMARY OF THE INVENTION

The invention has the object of improving a first stage pressure regulator as described hereinbefore, in which:

The movable wall for separating the balance chamber from the ambient exposed chamber is formed by a disk-shaped piston which is slideably and non sealingly guided along the peripheral walls of the balance chamber and by an elastically deformable diaphragm, which overlies the side of the piston facing toward the ambient exposed chamber and forms with said piston a diaphragm relief valve.

In a first variant embodiment, the diaphragm is sealingly and stably clamped at its peripheral edge, and has a relief hole in its central area, which is engaged on a coincident cylindrical or frustoconical extension of the piston projecting out of the side thereof facing toward the ambient exposed chamber.

The free end of the cylindrical or frustoconical extension possibly ends with a widened head having a diameter greater than that of the coincident through hole of the elastic diaphragm.

Advantageously, in this embodiment the elastic diaphragm has a bellows-shaped peripheral edge which is directly radially inwards from an annular peripheral lip or flange, which is designed to sealingly clamp said diaphragm.

According to an alternative embodiment, the peripheral edge of the piston which forms the movable separating wall between the balance chamber and the ambient exposed chamber is sealingly guided by the inner wall of the balance chamber, whereas said piston has at least one eccentric hole and supports a diaphragm valve on the side facing toward the ambient exposed chamber, at its central area and is free at its periphery.

In both embodiments, the diaphragm is preferably made of silicone or other highly elastic materials.

Further improvements will form the subject of the dependent claims.

The characteristics of the invention will appear more clearly from the following description of a few embodiments, which are shown without limitation in the annexed drawings, in which:

DETAILED DESCRIPTION OF THE INVENTION

Figure 1:
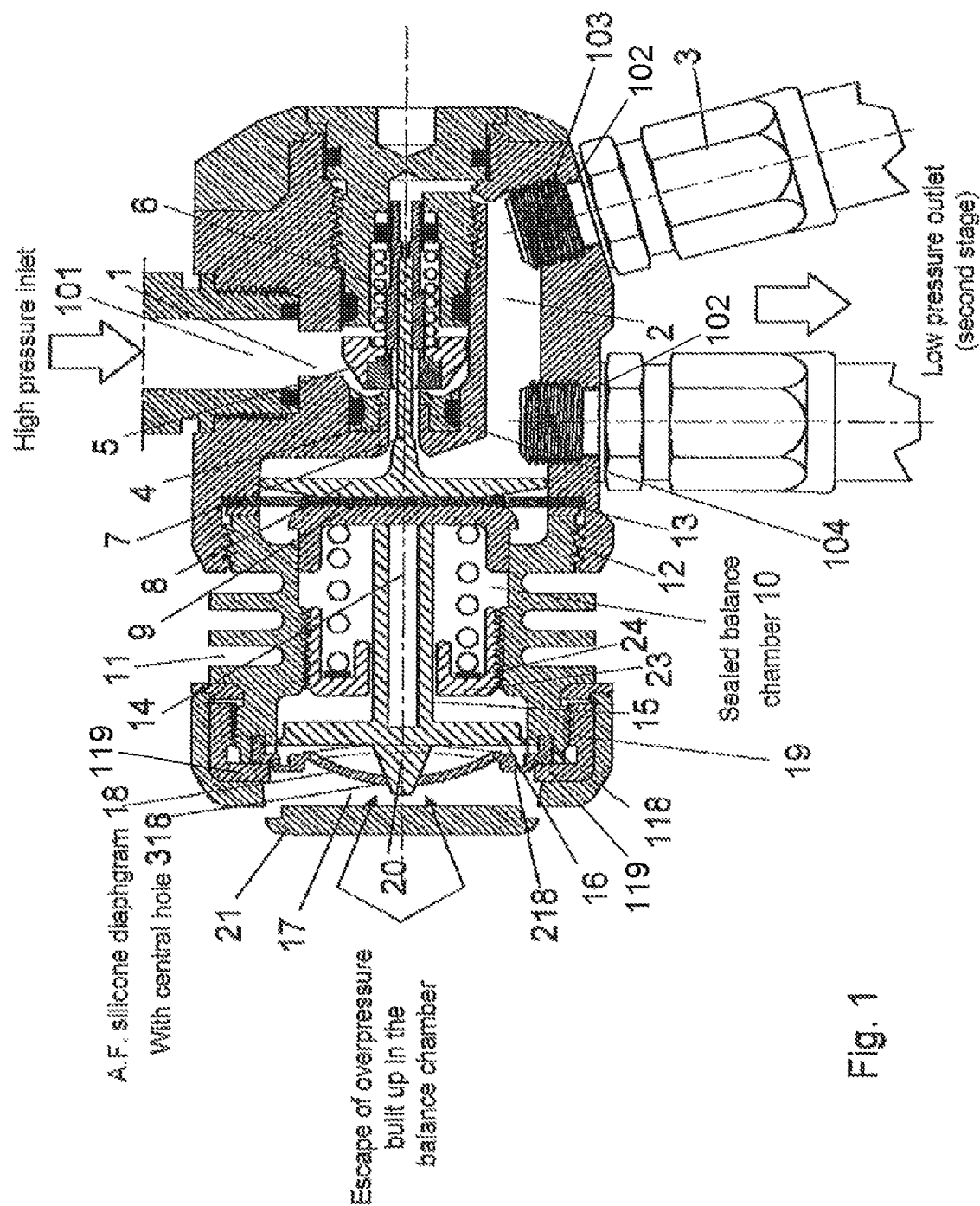
FIG. 1 is an axial cross sectional view of a first embodiment of the first stage pressure regulator according to this invention.

A first embodiment of the first stage pressure regulator of the present invention is shown in FIG. 1. Such first stage comprises a substantially cylindrical body having a first high pressure gas chamber 1 which communicates with a gas source (not shown in detail) such as a bottle or the like, through an inlet 101. A low pressure gas chamber 2, with gas having a lower pressure than the incoming gas, has at least one, two or more outlets 102 for said low pressure gas. In the figure the outlets are in the form of threaded holes in which threaded fittings 103 of hoses or the like are sealingly tightened. A regulating valve is provided between the high pressure gas chamber 1 and the low pressure gas chamber 2. This valve is composed of a stationary valve seat 4 and an element 5 which is mounted in such a manner as to be able to move towards and away from said valve seat. The valve element is mounted in such a manner as to slide along the axis of the passage 104 of the valve seat and has a surface exposed to the action of the high pressure gas which acts thereon in the opening direction, such sliding motion being opposed by preloadable elastic means 6, which stably act in the closing direction of the valve element against said valve seat 4. Pressure reduction occurs, as is known, thanks to the fact that the calibration of the elastic means and the ratio between the pressures in the two chambers causes the element to only open to such an extent and for such a time as to allow a small volume of high pressure air to pass in the low pressure gas chamber, and to expand in the low pressure gas chamber 2.

The regulating valve element 5 extends through the passage 104 of the valve seat 4 by an actuating stem 7 in the low pressure gas chamber 2 and ends with a piston, preferably having a circular shape 8. This piston 8 adheres by the surface opposite the control stem 7 against a first elastic diaphragm 9, thereby forming a movable wall for separating the low pressure gas chamber 2 from a balance chamber 10. The elastic diaphragm 9 is sealingly clamped along its outer peripheral edge. In the embodiment as shown, this occurs thanks to a threaded tubular member 11 which sealingly engages in an internally threaded bell joint 12 which peripherally delimits an annular shoulder 13 for clamping the peripheral edge of the diaphragm 9, which is thus clamped between said shoulder 13 and the end edge of the tubular member 11. The latter forms the peripheral shell wall of the balance chamber 10. A second bell-shaped piston 14 adheres against the diaphragm side opposite the low pressure gas chamber 2, and is rigidly connected by a central force transfer stem 15 to another piston 16, which forms the other movable wall of the balance chamber 10, that separates said balance chamber from an ambient exposed chamber 17. In this embodiment, the piston 16 is unsealingly guided by the inner surface of the tubular member 11 which forms the inner shell wall of the balance chamber 10, whereas the seal with the ambient exposed chamber is ensured by an elastic diaphragm 18. The elastic diaphragm 18 is sealingly clamped along its inner peripheral edge, like the diaphragm 9, between the externally threaded end side of the tubular member 11 and an internally threaded clamping ring 19. Particularly the peripheral edge of the diaphragm 18 has an axial flange 118 which is engaged in an annular axial groove, formed in the thickness of the end edge of the tubular member 11. The axial flange 118 is connected to the rest of the diaphragm 18 by an annular bellows-shaped part. The annular part for connection between the axial flange 118 and the annular bellows-shaped part 218 overlays the end edge of the tubular member 11 and is clamped between the latter and an annular radial shoulder 119 of the ring nut 19. An axial frustoconical extension 20 extends from the central area of the side of the piston 16 facing toward the diaphragm 18, thence toward the ambient exposed chamber 17, which extension engages with a central through hole 318 of the elastic diaphragm 18. The diameter of this hole substantially corresponds to the average diameter of the axial frustoconical extension 20 which acts as an a valve element, in combination with the natural elastic deformability of the diaphragm 18 and the hole 318. The ambient exposed chamber 17 is closed from the ambient by a cap 21, which has a plurality of apertures for communication with the ambient and overlays the ring nut 19, while being locked in position, for example, by snap engagement means, in an engagement groove. Particularly, these means may consist of an end flange which is formed as a small radial neck at the free edge of the cap 21, which is in snap engaging relationship with a groove formed between the end edge of the ring nut 19 for clamping the diaphragm 18 and a radial annular ridge of the tubular member 11 which is provided at an axial distance from said end edge of the ring nut 19.

A stationary abutment 23 for an elastic member 24, for instance a helical spring, is placed in an intermediate position in the balance chamber 10, in an axially adjustable manner, and is interposed between said stationary abutment and the bell-shaped piston 14. This elastic member generates an adjustable preload on the assembly formed by the bell-shaped piston 14, the force transfer stem 15 and the piston 16 subjected to the action of ambient pressure toward the low pressure gas chamber 2, therefore in the opening direction of the regulating valve element 5.

Advantageously, the stationary abutment 23 for the elastic member 24 consists of a cup-shaped annular member having an external thread for engagement with an internally threaded portion of the tubular member 11, which allows to adjust the compression of the elastic member 24 by simply tightening or loosening the abutment 23.

The operation of this first stage pressure regulator is easily understandable from the above description. The action of high pressure gas in combination with that of the elastic means associated to the valve element 5 is combined with the variable force exerted by ambient pressure, which is in turn assisted by the action of the elastic means 24. Ambient pressure is exerted on the piston 16 and transferred by the stem 15 to the bell-shaped piston and, thanks to the elastic diaphragm 9, to the piston 8 and to the element 5.

The diaphragm 18 which separates the balance chamber 10 from the ambient exposed chamber 17 and cooperates with the piston 16 and the frustoconical extension 20 thereof is an overpressure relief valve, which is designed to relieve the overpressure that may build up and actually builds up in the balance chamber 10. Such overpressure is obviously undesired, as it alters pressure balancing settings. The operation is schematically shown in FIG. 1. Assuming normal pressure conditions in the balance chamber 10, the diaphragm is pushed, either naturally or under the action of ambient pressure, at its central portion against the piston 16, therefore the central hole 318 slides along the frustoconical extension 20 in the increasing diameter direction, whereby a sealing condition is generated (see diaphragm outlined in dashed lines). When the balance chamber 10 is in overpressure conditions, the elastic diaphragm 18 bows in a direction opposite to that of the balance chamber 10 (see diaphragm outlined in full lines) and the hole 318 moves toward the apex of the frustoconical extension 20, i.e. in the decreasing diameter direction, whereby the seal between said extension 20 and said hole 318 is released, which allows gas to escape from the balance chamber 10 to the ambient exposed chamber 17.

Advantageously, as shown in FIG. 1, at the center of the diaphragm between the hole 318 and the annular bellows 218, the diaphragm may have a non flat, concave shape, e.g. in its natural rest condition, which defines, in combination with the bellows, a well-determined and repeatable rest position of the diaphragm, corresponding to the sealing position against the piston 16 and the extension 20.

The construction of the first stage pressure regulator as described above has further advantages. The construction of the balance chamber by using substantially a tubular member 11 with a ring nut 19 for clamping the peripheral edge of the diaphragm 16, as well as the engagement of said tubular member in a threaded bell shaped seat of the rest of the regulator body in which the low pressure gas chamber 2 and the high pressure gas chamber 1 are formed, allows easy assembly and dismantling and fast replacement of diaphragms and the other parts, such as the pistons 16 and 14. Furthermore, this construction affords an easier adjustment of the position of the stationary abutment 23 for the elastic member 24. It is further worth noting that there is no mechanical continuity between the piston 14 and the control stem 7 which connects the piston 16 to the valve element, and that the bell-shaped piston 14 acts as a presser on a separate piston 8, whereto said control stem 7 is attached. Therefore, dynamic functionality is obtained and maintained thanks to the provision of two separate construction parts. This allows to safely sealingly separate the balance chamber from the low pressure gas chamber by means of the elastic diaphragm 9 which is continuous, with no apertures therein, and is stably clamped at its periphery. This is of great importance, because any water ingress in the low pressure gas chamber would be highly undesired, said low pressure gas chamber 2 being the chamber wherefrom breathable air is taken. As is apparent, the construction of the first stage pressure regulator as shown in FIG. 1 provides an advantageous improvement with respect to the use of a single piston in lieu of two separate pistons 14 and 8, which single piston would be rigidly or integrally attached to the piston 16 and the element actuating stem 7. In this case, seal could only be provided by peripheral gaskets of said single piston, cooperating between the latter and the inner shell wall of the balance chamber and being highly exposed to wear due to their sliding motion along said walls.

Figure 2:
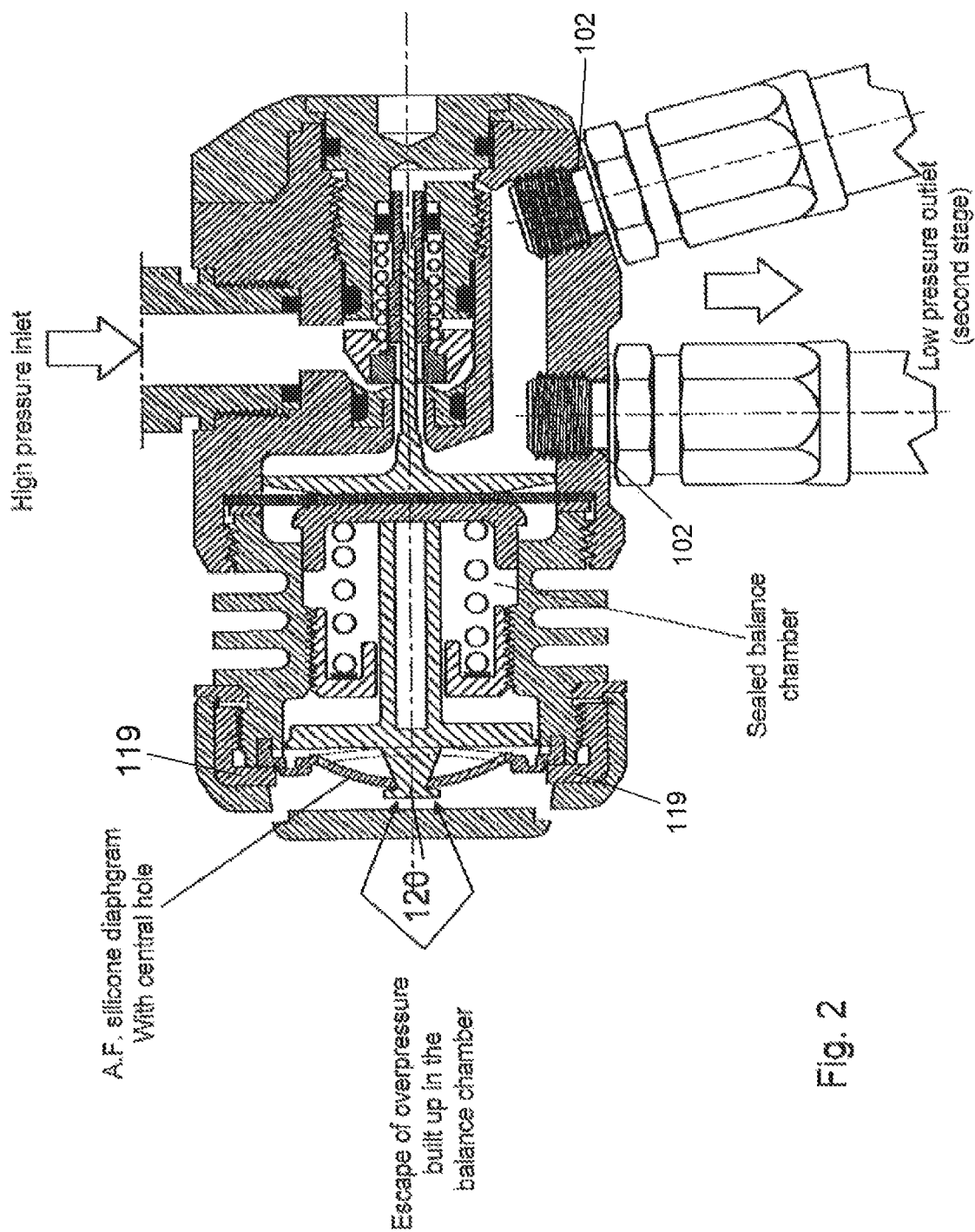
FIG. 2, like FIG. 1, shows a variant embodiment of the first stage pressure regulator according to FIG. 1.

The variant of FIG. 2 essentially shows a first stage pressure regulator having exactly the same construction as that described above with reference to FIG. 1. In FIG. 2 like parts or parts having like functions of those of FIG. 1 bear like numbers.

The substantial difference is that the free end of the frustoconical extension 20 of the piston 16 cooperating with the diaphragm 18 has a widened head 120 whose diameter is greater than the diameter of the hole 318 of the diaphragm 18 which is engaged on said extension. Such widened head has the function of preventing the diaphragm 18 from accidentally slipping off the frustoconical extension 20 in case of an abrupt overpressure relief. Here, if no widened head 120 were provided, an excessive deformation of the diaphragm might cause the diaphragm 18 to slip off the frustoconical extension 20 and, more seriously, to be radially offset with respect to said frustoconical extension 20, whereby the diaphragm 18 might get caught at the end of said frustoconical extension when it is moved back to the rest and sealing position, and might not prevent water ingress from the ambient to the balance chamber 10.

Figure 3:
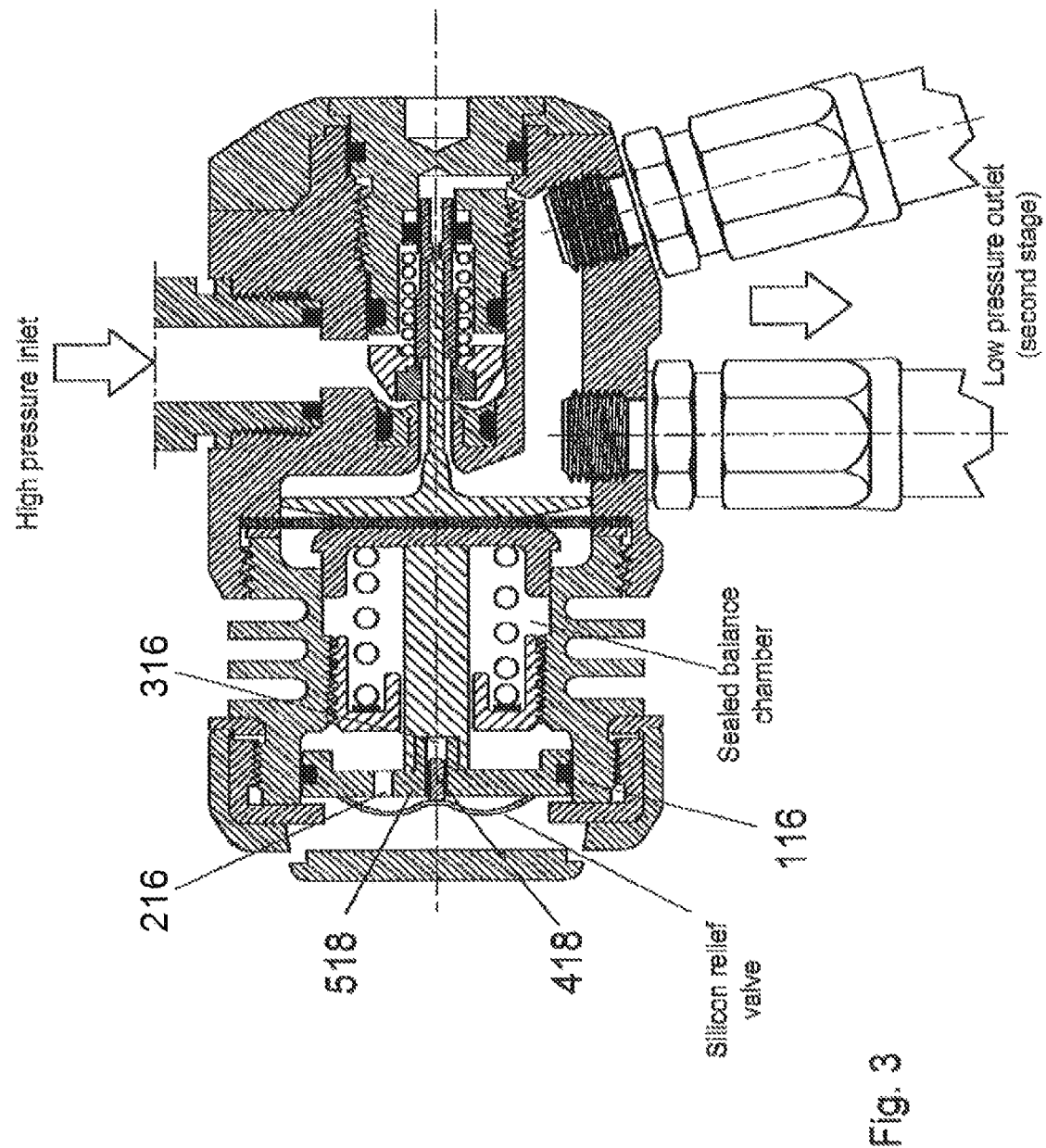
FIG. 3 shows, like the previous Figures, a second embodiment of the first stage pressure regulator according to this invention.

FIG. 3 shows yet another embodiment of the first stage pressure regulator according to this invention. Here again, the construction of said first stage is substantially identical to that of the previous figures, with the exception of the construction of the piston 16 and the diaphragm 18. In fact, in this variant embodiment, the seal between the ambient exposed chamber 17 and the balance chamber 10 is provided directly by the piston 16, which is sealingly guided along the inner wall of the balance chamber 10, i.e. the tubular member 11, thanks to annular peripheral sealing gaskets, e.g. an O-ring 116 received in a peripheral groove that is formed in the thickness of said piston 16. The piston further has at least one through hole 216 in an eccentric position or two or more holes or a ring of through holes, which are sealingly closed by the diaphragm 16 on the side facing toward the ambient exposed chamber 17. This diaphragm is a diaphragm element of a conventional diaphragm valve and is completely free at its periphery, whereas it is fixed to the piston 16 at its center. Fixation may occur in any manner whatever, e.g. by using a central axial pin for snap engagement in a snap hole 316 placed in coincidence with the piston 16. Particularly, the central pin 418 and the snap hole are coaxial, whereas the through holes 216 are at radial distances therefrom which are smaller than the radius of the diaphragm 16.

Particularly, the central pin 418 may have at least two opposite wedge-shaped teeth 518 or a ring of such wedge-shaped teeth or a radial annular conical projection, which is in elastic snap engagement with an inner annular shoulder or a ring of inner radial teeth or with corresponding inner radial teeth of the snap hole 316 in the piston 16. The section of the teeth or the annular conical projection has a front with a smaller slope on the side facing toward the free end of the pin, to form a lead-in surface and a substantially radial and perpendicular front on the opposite side, to provide firm anchorage behind the shoulder or the inner radial teeth of the hole 316.

This arrangement has the advantage of further simplifying construction and especially of facilitating the replacement of the diaphragm 16, which is most exposed to the ambient, thence to deterioration.

It is worth noting that the cap 21 which delimits the ambient exposed chamber 17 from the outside, therefore the chamber 17 itself are not necessarily required, said cap only providing mechanical protection to the diaphragm 16 against any accidental damage.

Therefore, this invention shall be intended to also cover the sub-combination in which the ambient exposed chamber 17 is not provided, and is formed by the ambient itself.

The invention claimed is:

1. A first stage pressure regulator for a two-stage underwater breathing apparatus, which first stage regulator is adapted to be connected to a source of high pressure breathable gas, and comprises:
    an inlet adapted to be connected to the source of high-pressure gas and an outlet for gas having a lower pressure than the incoming gas;
    a high pressure gas chamber communicating with said inlet and a low pressure gas chamber connected with said outlet;
    the low pressure gas chamber communicating with the high pressure gas chamber through a regulating valve;
    a balance chamber interposed between the low pressure gas chamber and a chamber communicating with the ambient or between the low pressure chamber and directly the ambient;
    said low pressure gas chamber being sealingly separated from the balance chamber by a first movable wall;
    said balance chamber being sealingly separated from the ambient exposed chamber or directly from the ambient by a second movable wall;
    said first and said second movable walls being mechanically and rigidly interconnected by a stem which is designed to transfer a force exerted on said movable walls;
    said first movable wall being further connected by force transfer means to a closing element of the regulating valve interposed between the high pressure gas chamber and the low pressure gas chamber;

a diaphragm relief valve being provided for relieving an overpressure build up in the balance chamber and being located between said balance chamber and said ambient exposed chamber or between said balance chamber and directly the ambient;

wherein the second movable wall for separating the balance chamber from the ambient exposed chamber or directly from the ambient is formed by a disk-shaped piston which is slideably guided along the peripheral walls that delimit the balance chamber and by an elastically deformable diaphragm, which overlies the side of the piston facing toward the ambient exposed chamber or facing toward directly the ambient and forms with said piston the diaphragm relief valve;

wherein the elastically deformable diaphragm is operable to deflect away from the piston and thereby break a seal formed directly therebetween that forms the diaphragm relief valve to allow overpressure in the balance chamber top escape therefrom.

2. A first stage pressure regulator as claimed in claim 1, wherein the diaphragm is made of silicone.

3. The first stage pressure regulator of claim 1 wherein the disk-shaped piston is slideably and non-sealingly guided along the peripheral walls that delimit the balance chamber and by the elastically deformable diaphragm.

4. A first stage pressure regulator for a two-stage underwater breathing apparatus, which first state regulator is adapted to be connected to a source of high pressure breathable gas, and comprises:

an inlet adapted to be connected to the source of high-pressure gas and an outlet for gas having a lower pressure than the incoming gas;

a high pressure gas chamber communicating with said inlet and a low pressure gas chamber connected with said outlet;

the low pressure gas chamber communicating with the high pressure gas chamber through a regulating valve;

a balance chamber interposed between the low pressure gas chamber and a chamber communicating with the ambient or between the low pressure chamber and directly the ambient;

said low pressure gas chamber being sealingly separated from the balance chamber by a first movable wall;

said balance chamber being sealingly separated from the ambient exposed chamber or directly from the ambient by a second movable wall;

said first and said second movable walls being mechanically and rigidly interconnected by a stem which is designed to transfer a force exerted on said movable walls;

said first movable wall being further connected by force transfer means to a closing element of the regulating valve interposed between the high pressure gas chamber and the low pressure gas chamber;

a diaphragm relief valve being provided for relieving an overpressure build up in the balance chamber and being located between said balance chamber and said ambient exposed chamber or between said balance chamber and directly the ambient;

wherein the second movable wall for separating the balance chamber from the ambient exposed chamber or directly from the ambient is formed by a disk-shaped piston which is slideably guided along the peripheral walls that delimit the balance chamber and by an elastically deformable diaphragm, which overlies the side of the piston facing toward the ambient exposed chamber or facing toward directly the ambient and forms with said piston the diaphragm relief valve; and wherein the diaphragm is sealingly and stably clamped at its peripheral edge, and has a relief hole in its central area, which is engaged on a coincident cylindrical or frustoconical extension of the piston projecting out of the side thereof facing toward the ambient exposed chamber or facing toward directly the ambient.

5. A first stage pressure regulator as claimed in claim 4, wherein the elastically deformable diaphragm has a bellows-shaped peripheral edge which is directly radially inwards from an annular peripheral lip or flange, which is designed to sealingly clamp said diaphragm.

6. A first stage pressure regulator as claimed in claim 4, wherein the extension of the piston has a frustoconical shape and tapers toward its free end, whereas the hole in the elastic diaphragm engaged therewith has a diameter that corresponds to a diameter of the frustoconical extension intermediate between the maximum and the minimum diameters thereof.

7. A first stage pressure regulator as claimed in claim 6, wherein the free end of the cylindrical or frustoconical extension ends with a widened head having a diameter greater than that of the coincident through hole of the elastic diaphragm.

8. A first stage pressure regulator as claimed in claim 4, wherein the first movable wall between the balance chamber and the low pressure gas chamber is formed by two opposed movable members, having therebetween an elastic sealing diaphragm, which is imperforate and sealingly locked against the peripheral wall of the balance chamber and/or the low pressure gas chamber by its peripheral edge or a peripheral annular band.

9. A first stage pressure regulator as claimed in claim 8, wherein one of the opposed movable members is rigidly connected to the piston on the side of the balance chamber facing toward the ambient exposed chamber or facing toward directly the ambient, and the other opposed movable member is rigidly and mechanically connected to the regulating valve element between said low pressure gas chamber and said high pressure gas chamber.

10. A first stage pressure regulator as claimed in claim 8, wherein the two opposed movable elements for separating the balance chamber from the low pressure gas chamber are two opposed pistons.

11. A first stage pressure regulator as claimed in claim 4, wherein the first and the second movable walls for delimiting the balance chamber from the ambient exposed chamber or delimiting the balance chamber from directly the ambient and from the low pressure gas chamber are movable in the same direction, which direction is at least parallel to the direction of motion of the closing element of the regulating valve between the low pressure gas chamber and the high pressure gas chamber.

12. A first stage pressure regulator as claimed in claim 10, wherein the pistons which form the movable elements for separating the balance chamber from the low pressure gas chamber are coaxial and mounted in such a manner as to be able to slide in the same direction.

13. A first stage pressure regulator for a two-stage underwater breathing apparatus, which first stage regulator is adapted to be connected to a source of high pressure breathable gas, and comprises:

an inlet adapted to be connected to the source of high-pressure gas and an outlet for gas having a lower pressure than the incoming gas;

a high pressure gas chamber communicating with said inlet and a low pressure gas chamber connected with said outlet;

the low pressure gas chamber communicating with the high pressure gas chamber through a regulating valve;

a balance chamber interposed between the low pressure gas chamber and a chamber communicating with the ambient or between the low pressure chamber and directly the ambient;

said low pressure gas chamber being sealingly separated from the balance chamber by a first movable wall;

said balance chamber being sealingly separated from the ambient exposed chamber or directly from the ambient by a second movable wall;

said first and said second moveable walls being mechanically and rigidly interconnected by a stem which is designed to transfer a force exerted on said moveable walls;

said first movable wall being further connected by force transfer means to a closing element of the regulating valve interposed between the high pressure gas chamber and the low pressure gas chamber;

a diaphragm relief valve being provided for relieving an overpressure build up in the balance chamber and being located between said balance chamber and said ambient exposed chamber or between said balance chamber and directly the ambient;

wherein the second movable wall for separating the balance chamber from the ambient exposed chamber or directly from the ambient is formed by a disk-shaped piston which is slideably guided along the peripheral walls that delimit the balance chamber and by an elastically deformable diaphragm, which overlies the side of the piston facing toward the ambient exposed chamber or facing toward directly the ambient and forms with said piston the diaphragm relief valve; and wherein in the peripheral edge of the piston forms the movable separating wall between the balance chamber and the ambient exposed chamber or between the balance chamber and directly the ambient, which is sealingly and slideably guided along the inner wall of the balance chamber, whereas said piston has at least one eccentric hole and supports the elastically deformable diaphragm on the side facing toward the ambient exposed chamber or facing toward directly the ambient, which element is held on the piston at its central area, said diaphragm being free at its periphery.

14. A first stage pressure regulator as claimed in claim 13, wherein the diaphragm element has a pin at its center, for snap engagement in a corresponding snap fit hole of the piston.

15. A first stage pressure regulator for a two-stage underwater breathing apparatus, which first stage regulator is adapted to be connected to a source of high pressure breathable gas, and comprises:

an inlet adapted to be connected to the source of high-pressure gas and an outlet for gas having a lower pressure than the incoming gas;

a high pressure gas chamber communicating with said inlet and a low pressure gas chamber connected with said outlet;

the low pressure gas chamber communicating with the high pressure gas chamber through a regulating valve;

a balance chamber interposed between the low pressure gas chamber and a chamber communicating with the ambient or between the low pressure chamber and directly the ambient;

said low pressure gas chamber being sealingly separated from the balance chamber by a first movable wall;

said balance chamber being sealingly separated from the ambient exposed chamber or directly from the ambient by a second movable wall;

said first and said second movable walls being mechanically and rigidly interconnected by a stem which is designed to transfer a force exerted on said movable walls;

said first movable wall being further connected by force transfer means to a closing element of the regulating valve interposed between the high pressure gas chamber and the low pressure gas chamber;

a diaphragm relief valve being provided for relieving an overpressure build up in the balance chamber and being located between said balance chamber and said ambient exposed chamber or between said balance chamber and directly the ambient;

wherein the second movable wall for separating the balance chamber from the ambient exposed chamber or directly from the ambient is formed by a disk-shaped piston which is slideably guided along the peripheral walls that delimit the balance chamber and by an elastically deformable diaphragm, which overlies the side of the piston facing toward the ambient exposed chamber or facing toward directly the ambient and forms with said piston the diaphragm relief valve; and further comprising a body part, in which the high pressure gas chamber, the low pressure gas chamber and the regulating valve between said two chambers are provided, which body part ends, on the side of the balance chamber, with a bell-shaped threaded fitting for a tubular member which forms a shell wall of the balance chamber and has threaded ends, whereas a ring nut is provided on the side opposite the low pressure gas chamber, which ring nut may be tightened on said tubular member, the bell-shaped fitting having an annular shoulder for sealingly clamping the peripheral edge of an elastic diaphragm that sealingly separates the low pressure gas chamber from the balance chamber, between said shoulder and the end edge of the tubular member which forms the shell wall of the balance chamber.

16. A first stage pressure regulator as claimed in claim 15, wherein the ring nut to be tightened onto the end of the tubular member opposite the low pressure gas chamber has an annular radial flange for sealingly clamping the peripheral edge of the elastically deformable diaphragm which separates the balance chamber from directly the ambient or from the ambient exposed chamber, against the end edge of said end of the tubular member.

17. A first stage pressure regulator for a two-stage underwater breathing apparatus, which first stage regulator is adapted to be connected to a source of high pressure breathable gas, and comprises:

an inlet adapted to be connected to the source of high-pressure gas and an outlet for gas having a lower pressure than the incoming gas;

a high pressure gas chamber communicating with said inlet and a low pressure gas chamber connected with said outlet;

the low pressure gas chamber communicating with the high pressure gas chamber through a regulating valve;

a balance chamber interposed between the low pressure gas chamber and a chamber communicating with the ambient or between the low pressure chamber and directly the ambient;

said low pressure gas chamber being sealingly separated from the balance chamber by a first movable wall;

said balance chamber being sealingly separated from the ambient exposed chamber or directly from the ambient by a second movable wall;

said first and said second movable walls being mechanically and rigidly interconnected by a stem which is designed to transfer a force exerted on said movable walls;

said first movable wall being further connected by force transfer means to a closing element of the regulating valve interposed between the high pressure gas chamber and the low pressure gas chamber;

a diaphragm relief valve being provided for relieving an overpressure build up in the balance chamber and being located between said balance chamber and said ambient exposed chamber or between said balance chamber and directly the ambient;

wherein the second movable wall for separating the balance chamber from the ambient exposed chamber or directly from the ambient is formed by a disk-shaped piston which is slideably guided along the peripheral walls that delimit the balance chamber and by an elastically deformable diaphragm, which overlies the side of the piston facing toward the ambient exposed chamber or facing toward directly the ambient and forms with said piston the diaphragm relief valve; and wherein the piston facing toward the ambient exposed chamber or facing toward directly the ambient is in direct contact with the ambient.

\* \* \* \* \*